United States Patent Office 3,275,688
Patented Sept. 27, 1966

3,275,688
3,4,5-TRI(LOWER)ALKOXYCINNAMAMIDES
Corris Mabelle Hofmann, Ho-Ho-Kus, N.J., assignor to American Cyanamid Company, Stamford, Conn., a corporation of Maine
No Drawing. Original application Oct. 5, 1960, Ser. No. 60,544. Divided and this application Oct. 4, 1963, Ser. No. 313,783
6 Claims. (Cl. 260—559)

This application is a division of my application Serial No. 60,554, filed October 5, 1960, now abandoned, which in turn is a continuation-in-part of my application Serial No. 850,076, filed November 2, 1959, now abandoned.

This invention relates to novel organic compounds and more particularly is concerned with novel, 3,4,5-tri-(lower)alkoxycinnamamides which may be represented by the following general formula:

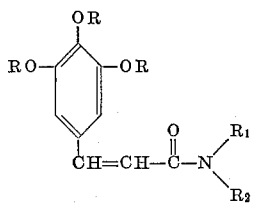

wherein R is lower alkyl and $R_1$ and $R_2$ are hydrogen or lower alkyl. Suitable lower alkyl substituents are methyl, ethyl, propyl, isopropyl, butyl, etc.

The novel compounds of this invention are useful pharmaceuticals. It has been discovered that these compounds possess desirable pharmacological properties and in particular are capable of producing a tranquilizing effect in man and animals with minimum side effects. The dosage required to produce a tranquilizing effect without noticeable toxic side effects varies between 0.2 milligram and 20.0 milligrams per kilogram of body weight.

The steps involved in preparing the novel compounds of the present invention may be depicted as follows:

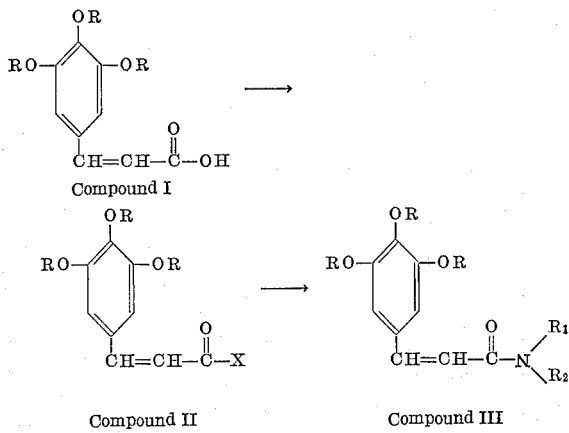

wherein X is halogen, R is lower alkyl, and $R_1$ and $R_2$ are hydrogen or lower alkyl. In the above scheme lower alkyl substituents may be methyl, ethyl, propyl, isopropyl, butyl, etc.

The hydroxyl group of the 3,4,5-tri(lower)alkoxycinnamic acids (Compound I) may be replaced by means of various reagents whereby the 3,4,5-tri(lower)alkoxy-cinnamoyl halides (Compound II) are obtained. For this purpose there may be used phosphous trichloride, phosphorus tribromide, phosphorous pentachloride, phosphorous pentabromide, phosphorous oxychloride, phosphorous oxybromide, sulfufuryl chloride, thionyl chloride, or thionyl bromide. However, I prefer to use thionyl chloride for the preparation of the corresponding intermediate 3,4,5-tri(lower)alkoxycinnamoyl chloride. The recation may be carried out at temperatures ranging from about 15° C. to about 100° C. The reaction may be carried out in the absence of a solvent or in a solvent which will not enter into the reaction under the conditions employed in the present invention. Such solvents may be, for example, diethyl ether, chloroform, carbon tetrachloride, V.M. & P. naphtha, or benzene. The resulting 3,4,5-tri-(lower)alkoxycinnamoyl halide (Compound II) is then treated with ammonia or with an appropriate primary or secondary amine such as, for example, dimethyl amine, diethyl amine, isopropyl amine, or isobutyl amine, whereby the corresponding 3,4,5-tri(lower)alkoxycinnamamide (Compound III) is obtained. This reaction may be carried out at temperatures ranging from about 15° C. to about 50° C. Since this reaction is exothermic, it is preferred to carry out the reaction in a solvent or a solvent pair which will not enter into the reaction under the conditions employed in the present invention. Solvents which may be used, for example, are diethyl ether, chloroform, carbon tetrachloride, V.M. & P. naphtha, or benzene. Solvent pairs which may be used, for example, are diethyl ether-water, chloroform-water or benzene water.

The invention will be described in greater detail in conjunction with the following specific examples.

EXAMPLE 1

*Preparation of 3,4,5-trimethoxycinnamoyl chloride*

In 50 parts of thionyl chloride is dissolved 7 parts of 3,4,5-trimethoxycinnamic acid and the solution is refluxed for 2 hours on a steam bath. The excess thionyl chloride is removed under vacuum whereby there is obtained solid crystalline 3,4,5-trimethoxycinnamoyl chloride.

EXAMPLE 2

*Preparation of 3,4,5-trimethoxycinnamamide*

In 50 parts of diethyl ether is dissolved 7 parts of 3,4,5- is added at room temperature, with stirring, to 50 parts of aqueous ammonia. After the addition is complete, the ether is allowed to evaporate and the crude product is removed from the aqueous phase by filtration. After crystallization from absolute ethanol, there is obtained white crystalline 3,4,5-trimethoxycinnamamide.

EXAMPLE 3

*Preparation of N,N-diethyl-3,4,5-trimethoxycinnamamide*

In 50 parts of diethyl ether is dissolved 7 parts of 3,4,5-trimethoxycinnamoyl chloride. The resulting solution is added at room temperature, with stirring, to a solution of 7 parts of diethyl amine dissolved in 50 parts of water. After the addition is complete, the ether is allowed to evaporate and the crude product is removed from the aqueous phase by filtration. After crystallization from absolute ethanol, there is obtained white crystalline N,N-diethyl-3,4,5-trimethoxycinnamamide.

EXAMPLE 4

*Preparation of N-isopropyl-3,4,5-trimethoxycinnamamide*

In 50 parts of chloroform is dissolved 7 parts of 3,4,5-trimethoxycinnamoyl chloride. The resulting solution is added at room temperature, with stirring, to a solution of 7 parts of isopropyl amine dissolved in 50 parts of chloroform. After the addition is complete, the chloroform is allowed ot evaporate and the residue is taken up in 50 parts of water. The crude product is removed from the aqueous phase by filtration and crystallized from absolute ethanol whereby there is obtained white crystalline N-isopropyl-3,4,5-trimethoxycinnamamide.

What is claimed is:
1. A compound of the formula:

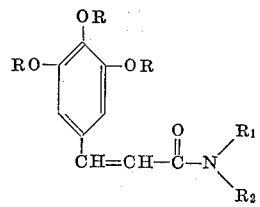

wherein R is lower alkyl and $R_1$ and $R_2$ are each selected from the group consisting of hydrogen and lower alkyl.
2. 3,4,5-trimethoxycinnamamide.
3. N,N-diethyl-3,4,5-trimethoxycinnamamide.
4. N-isopropyl-3,4,5-trimethoxycinnamamide.
5. N,N-dimethyl-3,4,5-trimethoxycinnamamide.
6. N-isobutyl-3,4,5-trimethoxycinnamamide.

References Cited by the Examiner
UNITED STATES PATENTS

| | | | |
|---|---|---|---|
| 1,939,496 | 12/1933 | Gyggenheim | 260—559 |
| 2,251,287 | 8/1941 | Lott | 260—559 |

FOREIGN PATENTS 403,892  1/1934  Great Britain.

OTHER REFERENCES

Gopinath et al., Journ. Chem. Soc. (London), 1957, pages 1144–5 relied on.
Noller, Chemistry of Organic Compounds, 2nd ed., pages 161, 237, and 244, Philadelphia, Saunders, 1958.

WALTER A. MODANCE, *Primary Examiner.*

NATALIE TROUSOF, *Assistant Examiner.*